(12) United States Patent
Yasue

(10) Patent No.: US 7,646,923 B2
(45) Date of Patent: Jan. 12, 2010

(54) METHOD AND APPARATUS FOR COMPRESSING A STREAM OF VIDEO DATA

(75) Inventor: Masahiro Yasue, Tokyo (JP)

(73) Assignee: Sony Computer Entertainment Inc. (JP)

( * ) Notice: Subject to any disclaimer, the term of this patent is extended or adjusted under 35 U.S.C. 154(b) by 933 days.

(21) Appl. No.: 11/045,774

(22) Filed: Jan. 28, 2005

(65) Prior Publication Data

US 2006/0171597 A1 Aug. 3, 2006

(51) Int. Cl.
*G06K 9/36* (2006.01)
(52) U.S. Cl. .................. 382/232; 382/245; 382/250
(58) Field of Classification Search .............. 382/232, 382/250, 245; 327/307, 339; 341/50, 87, 341/118; 375/240, E7.088
See application file for complete search history.

(56) References Cited

U.S. PATENT DOCUMENTS 3,953,805 A * 4/1976 Couvillon ............... 327/307

7,174,047 B2 * 2/2007 Lin et al. ................. 382/250

* cited by examiner

*Primary Examiner*—Anh Hong Do
(74) *Attorney, Agent, or Firm*—Lerner, David, Littenberg, Krumholz & Mentlik, LLP

(57) ABSTRACT

A method of and apparatus for compressing a stream of data, such as video data, is disclosed. First, data in the video stream are classified in accordance with their values. Data with values equal to zero are classified in a first class. Data with values less than a predetermined positive number but greater than a predetermined negative number, and not equal to zero, are classified in a second class. All other data are classified in a third class. Data in the first class is compressed using a run length encoding technique. Data in the second class is compressed by reducing the size of the data value and by adding a constant. Data in the third class is not compressed, but is modified by adding a constant. The data can be decompressed by determining the class of the compressed value and reversing the compression process. The compression method disclosed is easy to implement and results in a significant reduction in the amount of data that needs to be transmitted.

51 Claims, 7 Drawing Sheets

| DECIMAL NUMBER | HEX NUMBER | CLASS | COMPRESSION | OTHER | COMPRESSED VALUES |
|---|---|---|---|---|---|
| >63 | >3FH | 2 | None | ADD C000H and 2000H (E000H) | E003FH to FFFFH |
| 1 to 63 | 1H to 3FH | 1 | Compress To 1 Byte | ADD 40H | 41H to 7FH |
| 0 | 0000H | 0 | RLE | None | Depends On Number Of Successive Zeros |
| -64 to -1 | FFC0H to FFFFH | 1 | Compress To 1 Byte | ADD 40H | 0H to 40H |
| <-64 | <FFC0H | 2 | None | ADD C000H and 2000H (E000H) | C000H to DFBFH |

FIG. 2

METHOD AND APPARATUS FOR COMPRESSING A STREAM OF VIDEO DATA

BACKGROUND OF THE INVENTION

The present invention relates to compressing data in a stream of video data, including data representing video still images.

Modern signal processing is generally highly data intensive. As such, methods of compressing the data are an important part of processing data. For example, video signals such as still video images are frequently encoded and decoded using the JPEG standard, which includes a data compression step.

There are different methods for compressing the data and still images. For example, in JPEG processing of still images, entropy compression is commonly used. One form of entropy compression that is frequently used in JPEG processing is Huffman compression. Another form of entropy compression that is commonly used in JPEG processing is arithmetic compression.

These methods of compressing data in a video data stream are computationally complex, and can require a great deal of processing power. Further, they can require complex hardware and software to implement. Further, Huffman compression and arithmetic compression are not necessary for every application. For example, in a software developer's kit, it is not always appropriate or preferable to use these complex forms of data compression.

Accordingly, new and simpler forms of data compressions for video data streams are needed.

SUMMARY OF THE INVENTION

One aspect of the present invention provides a method of compressing a stream of data, comprising: assigning data in the stream of data whose value is equal to zero to a first class; assigning data in the stream of data whose value is between a predetermined positive value and a predetermined negative value, excluding when the data's value is equal to zero, to a second class; assigning all other data in the stream of data to a third class; compressing the data in the first class by run length encoding; and compressing the data in the second class by reducing the size of the data.

The compressing of the data in the second class may include dropping the most significant bits of the data, and may include adding a constant, such as 40 hexadecimal, to the reduced size data. A constant may also be added to data in the third class, such as C000H plus 2000H. Preferably, the data in the second class is sixteen bits long and the eight most significant bits of data in the second class are dropped.

Preferably, the data assigned to each class is sixteen bits long, the predetermined positive value is 63 and the predetermined negative value is –64. Further, the eight most significant bits of the data in the second class can be dropped. The method may also include adding C000 hexadecimal plus 2.000 hexadecimal to data in the third class. Also the number of zeros in the run length encoding of the data in the first class can be represented by 80 hexadecimal plus the number of zeros less one.

Another aspect of the present invention provides a method of compressing a stream of data containing a plurality of data items, comprising: determining the values of a plurality of data items in the stream of data; run length encoding successive data items having a value of zero; and compressing the data items by dropping a predetermined number of most significant bits from the data items, such that only bits having a value of zero are dropped, if the value of the data items is not equal to zero and is between a predetermined positive value and a predetermined negative value. The above steps can be repeated for successive data items in the stream of data. In addition, a constant can be added to the data items whose most significant bits were dropped. Also, a constant can be added to all of the data items that are equal to or exceed the predetermined positive value or are equal to or less than the predetermined negative value.

Preferably, the data items are 16 bits long, the predetermined positive value is 63, the predetermined negative value is negative 64 and the eight most significant bits of each of the data items is dropped when the value of the date items is not equal to zero and is between the positive predetermined value and the negative predetermined value. In addition, 40H can be added to the data item having its eight most significant bits dropped. Also, C000H plus 2000H can be added to the data items having a value greater than or equal to the predetermined positive value and to the data items having a value less than or equal to the predetermined negative value.

A further aspect of the present invention provide apparatus for compressing a stream of data, comprising a processor programmed to: assign data whose value is equal to zero to a first class; assign data whose value is between a predetermined positive value and a predetermined negative value, excluding when the data's value is equal to zero, to a second class; assign all other data in the stream of data in a third class; compress the data in the first class by run length encoding; and compress the data in the second class by reducing the size of the data.

In such apparatus, the processor in compressing data in the second class can drop the most significant bits of the data and can add a constant to the reduced size data. Further, the processor in placing data in the third class can add a constant to data in the third class. Preferably, the data assigned to each class is sixteen bits long and the processor in compressing data in the second class drops the eight most significant bits of data. The processor in compressing data, can add 40 hexadecimal to data in the second class and add C000H plus 2000H to data in the third class. Preferably, the data processed by the processor is sixteen bits long, the predetermined positive value is 63 and the predetermined negative value is –64. The processor in compressing data in the second class can also drop the eight most significant bits of data in the second class. The number of zeros in the run length encoding of the data in the first class can be represented by 80 hexadecimal plus the number of zeros less one.

A still further aspect of the present invention provides apparatus for compressing a stream of data containing a plurality of data items, comprising a processor programmed to: determine the values of a plurality of data items in the stream of data; run length encode successive data items having a value of zero; and compress the data items by dropping a predetermined number of most significant bits from the data items such that only bits having a value of zero are dropped, if the value of the data items is not equal to zero and is between a predetermined positive value and a predetermined negative value. Each successive data item in the stream of data can be processed by the processor, which can further add a constant to the data items whose most significant bits were dropped.

The processor can also further add a constant to all data items that are equal to or exceed the predetermined positive value or is equal to or less than the predetermined negative value. Preferably, the data items are 16 bits long, the predetermined positive value is 63, the predetermined negative value is negative 64 and the processor drops the eight most significant bits of data of the data items in the second class. The processor can add 40H to the data items having their eight most significant bits dropped, and can further add C000H plus 2000H to the data items greater than or equal to the predetermined positive value and to the data items less than or equal to the predetermined negative value.

Another aspect of the present invention provides a computer readable medium having a sequence of instructions for compressing a stream of data, wherein execution of the instructions causes a processor to: assign data whose value is equal to zero to a first class; assign data whose value is between a predetermined positive value and a predetermined negative value, excluding when the data's value is equal to zero, to a second class; assign all other data in the stream of data to a third class; compress the data in the first class by run length encoding; and compressing the data in the second class by reducing the size of the data. The compressing of the data in the second class preferably includes dropping the most significant bits of the data and adding a constant to the reduced size data. A constant can be added to data in the third class, and the data is preferably sixteen bits long and the eight most significant bits of data in the second class are dropped. The constant added to data in the second class can be 40 hexadecimal, and C000H plus 2000H can be added to data in the third class. Preferably, the assigned data is sixteen bits long and the predetermined positive value is 63 and the predetermined negative value is −64, and the eight most significant bits of data in the second class are dropped. Preferably, the number of zeros in the run length encoding of the data in the first class is represented by 80 hexadecimal plus the number of zeros less one.

Finally, another aspect of the present invention provides a system for sending and receiving a compressed stream of data comprising a compression and decompression processor. The compression processor is for receiving a stream of uncompressed data, assigning data in the stream of data whose value is equal to zero to a first class, assigning data in the stream of data whose value is between a predetermined positive value and a predetermined negative value, excluding when the data's value is equal to zero, to a second class; assigning all other data in the stream of data to a third class, compressing the data in the first class by run length encoding, compressing the data in the second class by reducing the size of the data, and transmitting a stream of the compressed data to a remote location. The decompression processor is for receiving the stream of compressed data and decompressing the compressed data.

The present invention is conveniently and easily implemented in software that can be run by various types of processors (e.g., microprocessors, general or special purpose processors, devices that contain processors, etc.). Thus, for example, another aspect of the present invention provides a system for sending and receiving a compressed stream of data that includes a compression processor for receiving a stream of uncompressed data, assigning data in the stream of data whose value is equal to zero to a first class, assigning data in the stream of data whose value is between a predetermined positive value and a predetermined negative value, excluding when the data's value is equal to zero, to a second class; assigning all other data in the stream of data to a third class, compressing the data in the first class by run length encoding, compressing the data in the second class by reducing the size of the data, and transmitting a stream of the compressed data to a remote location. The system may also include a decompression processor for receiving the stream of compressed data and decompressing the compressed data. Other implementations, however, are also possible. For example, various hardware (e.g., integrated circuits, programmable logic devices) or combinations of hardware and software could be used to implement the compression methods of the present invention.

BRIEF DESCRIPTION OF THE DRAWINGS

FIG. 2 in a table that further illustrates how data is compressed in accordance with a preferred embodiment of the present invention.

DETAILED DESCRIPTION

Figure 1:
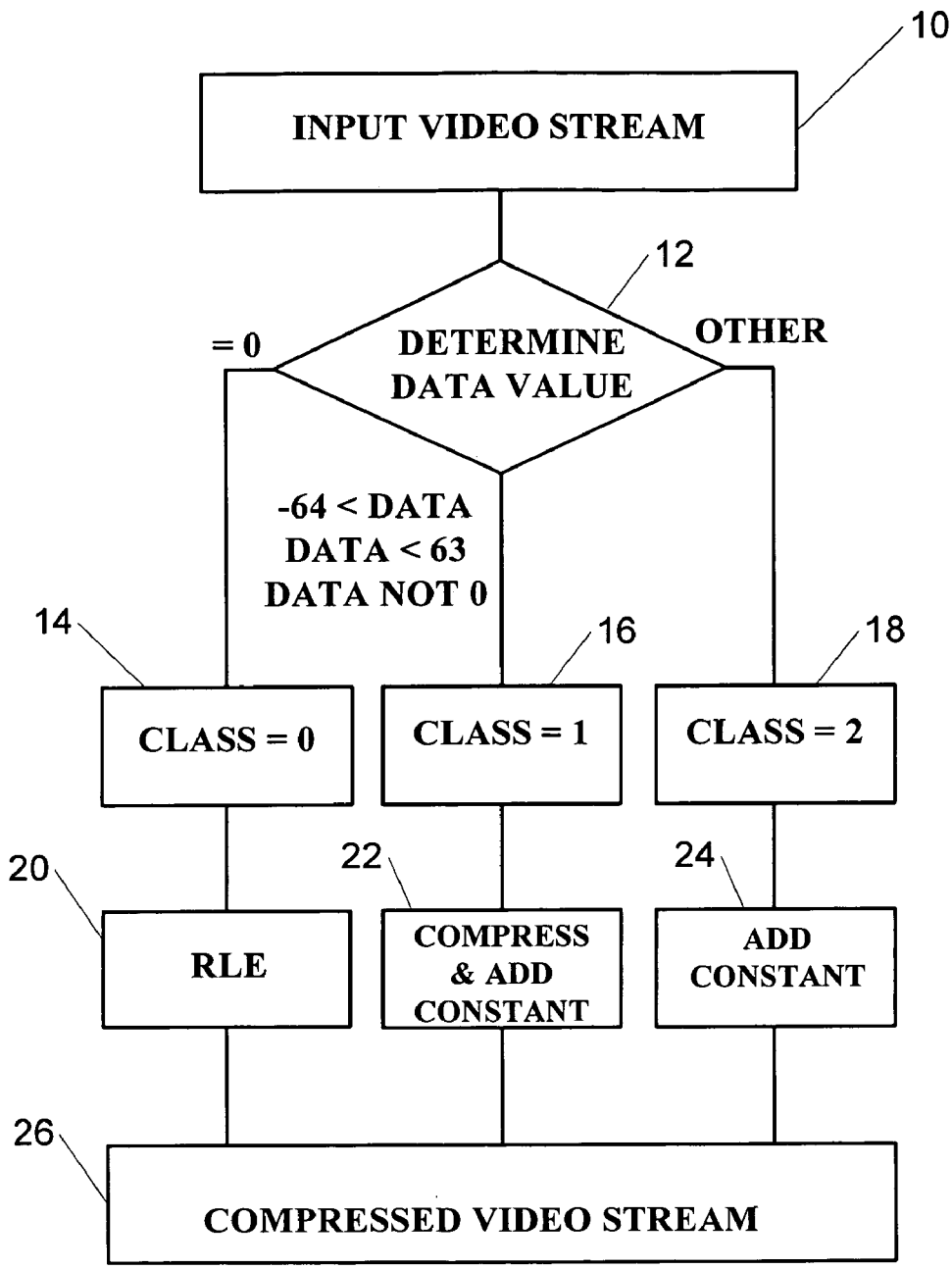
FIG. 1 illustrates a method of compressing a stream of video data in accordance with a preferred embodiment of the present invention.

FIG. 1 illustrates the method of compressing a stream of video data in accordance with one aspect of the present invention.

The following description includes, at various times, various numbering schemes. The description includes decimal numbers (base 10) and hexadecimal numbers (base 16). Throughout this specification, the following convention is used: If the number is a hexadecimal number, an "H" will be placed at the end of the value. For example, a two byte "1" is represented as 0001H. A number without the "H" should be construed as a decimal number.

Referring to FIG. 1, in step 10, a video stream of data is input to a processor. In accordance with a preferred embodiment of the present invention, a data value consists of two bytes of information (sixteen bits). It should be understood that the present invention could be used with other types and sizes of data in a stream of data.

In step 12, each piece of data within the video stream is analyzed to determine its value. If a particular piece of data has a value equal to zero, that is, 0000H, then in step 14 that piece of data is assigned to class 0.

On the other hand, in step 12, if the data value is not equal to zero but falls within the range of a predetermined negative number and a predetermined positive number, then, in step 16, the data value is classified in a second class, class 1. In accordance with a preferred embodiment of the present invention, the predetermined negative number is −64 and the predetermined positive number is 63. In step 18, all other data that does not fit unto the definition of class 0 or class 1 is placed into a third class, class 2.

After the data items have been placed in the appropriate class based on their values, the data items are compressed in accordance one aspect of the present invention. In step 20, data values in class 0, that is data values with a zero value, are compressed using run length encoding (RLE).

In RLE, a number data items, each having a zero value, in the stream of data, are represented by a single number. In accordance with a preferred embodiment of the present invention, the number of consecutive zeros is represented by 8XH, wherein X is the number of consecutive zero minus one. Thus, for example, a run of five zeros in the stream of data, such as, 0000H, 0000H, 0000H, 0000H, 0000H, is compressed and represented as 84H.

In step 22, when data from class 1 is encountered, a data value is compressed by eliminating a selected number of the most significant bit from the data value. In accordance with a preferred embodiment of the present invention, the data items are two bytes long and the most significant byte of the data is eliminated. In the case where class 1 data includes those data values between −64 and 63, the most significant byte of data values in class 1 are zeros. Thus, removing the most significant byte does not result in the loss of any information from the data value. In accordance with one aspect of the present invention, the number of most significant bits is related to the size of the predetermined positive number and the predetermined negative number. The number of most significant bits dropped is chosen, in accordance with one aspect of the present invention, such that no information is lost—that is only zeros are dropped.

In accordance with another aspect of the present invention, a constant is added to the compressed class 1 data values. In accordance with a preferred embodiment of the present invention, the constant 40H is added to the compressed values in class one.

In accordance with the preferred embodiment of the present invention class 2 data values are not compressed. It is, however, preferred to add a constant to data values falling into class 2. In accordance with a preferred embodiment of the present invention, the value C000H plus 2000H is added to all class 2 data values. This is equivalent to adding E000H to the class 2 data values.

Next, in step 26, the compressed video stream is composed. This step is performed by taking each resulting data value from step 20, step 22, and step 24, in succession as the data value is received, and placing the compressed and modified data item in its proper position in the compressed data stream.

Referring back to FIG. 1, it should be understood that the steps 14, 16 and 18 of classifying data need not be implemented. For example, as the data value is received, the compression can be performed by determining the value of the data item and performing the steps 20, 22 and 24 directly on the data value to construct a compressed data stream.

In accordance with a preferred embodiment of the present invention, the following psuedo code can be utilized to generate the compressed data stream:

```
INData[sizex, sizey]:
    input data. Resolution is (size X x sizey).
    Input data is divided to block. In this
    implementation, block size is 8 x 8. each block has
    64 element data and total block number is ((sizex/8)
    x (sizey/8))
Data[i]:
    element of block. In this implementation, minimum
    value is −2000H and maximum value is 1fffH. i = 0 ...
    63
zerocnt:
    used for run length number. It is number of class0
    data in block array.
outdata[n]:
    compressed code of block data.
Below is compression code for block data
For (i = 0; i < 64; i++)
    If (data[i] == 0)
        zerocnt = zerocnt + 1
```

-continued

```
    Else
        If (zerocnt > 0)
            outdata[n] = zerocnt − 1 + 80H
        Else If (data[i] >= −64 && data[i] <= 63)
            outdata[n] = data[i] + 64
        Else
            outdata[n] = data[i] + 2000H + C000H
        Endif
        n = n + 1
    Endif
Endfor
If (zerocnt > 0)
    outdata[n] = zerocnt − 1 + 80H
Endif
```

FIG. 2 illustrates the compression of a data stream in accordance with the preferred embodiment of the present invention.

Row 30 illustrates what happens when a data item having a value of zero is encountered. The hexadecimal value of this data is 0000H. This data would be classified in class 0 and is run length encoded, as previously described. Any form of run length encoding can be used in this step. In accordance with the preferred embodiment of the present invention, however, a number of successive zeros in the data is compressed to be 8XH, wherein X equals the number of successors zero values minus 1.

Row 32 illustrates what happens to a data item in a data stream wherein the data item has a value between 1 and 63. This corresponds to hexadecimal data values of 0001H to 0003FH. Data within this value range is classified in class 1. The most significant byte of this data is dropped so that only the less significant byte of data remains. It is further preferred to add 40H to the compressed class 1 data, as previously discussed. The resulting compressed values range from 41H to 7FH.

The row 34 illustrates what happens to data items in a data stream wherein the data has a value in the range of −64 to −1. The hexadecimal values in this range correspond to FFC0H to FFFFH. Data having a value within this range is also classified as class 1. As was the case with data and row 32, the data and row 34 is compressed to one byte by dropping the most significant byte. Further, it is also preferred to add a constant, such 40H, to the compressed data. As a result, the compressed values from negative numbers in class 1, in accordance with the preferred embodiment of the present invention, are 0H to 40H.

Row 36 illustrates the processing of data in a data stream having a value greater than or equal to 63, in accordance with the preferred embodiment of the present invention. This data is classified in class 2. The hexadecimal values of data in class 2 are greater than 003FH. As indicated in FIG. 2, there is no compression of class 2 data. It is, however, preferred to add a constant to the data, as previously discussed. That constant, in accordance with the preferred embodiment of the present invention is C000H+2000H (E000H). Thus, when class 2 data is received, the value transmitted in the compressed data stream, ranges from E003FH to FFFFH.

Row 38 illustrates the processing of data items that have a value less than −64. This data is classified as class 2 data. The hexadecimal value of this data is less than FFC0H. As was the case with positive class 2 data, this data is not compressed. Also, it is preferred to add a constant to negative class 2 data. In accordance with the preferred embodiment of the present invention, the value E000H is added. Thus, when negative class 2 is received, the data transmitted and the compressed data stream corresponds to C000H to DFBFH.

Figure 3:
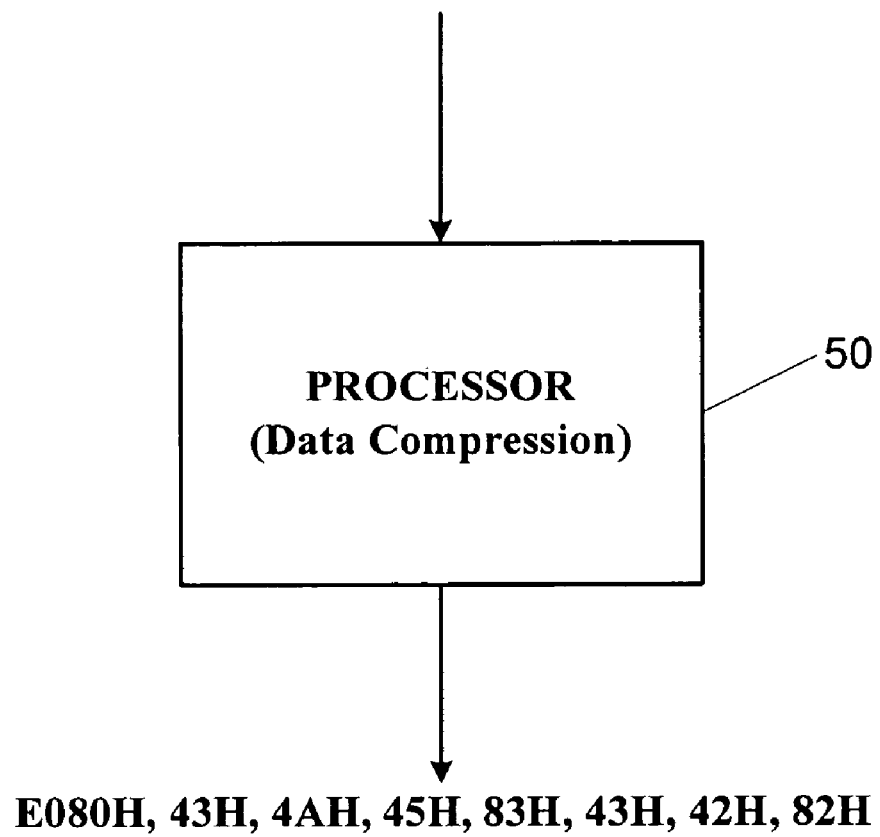
FIG. 3 illustrates an example of data compression in accordance with a preferred embodiment of the present invention.

FIG. 3 illustrates a stream of video data, or other data, which is input to a processor 50. The processor 50 compresses the data stream in accordance with the present invention, and outputs a compressed stream of video data. The input stream of video data is 0080H, 0003H, 000AH, 0005H, 000H, 0000H, 0000H, 0000H, 0003H, 0002H, 0000H, 0000H, 0000H. When the processor 50 receives the first bit, 0080H, it classifies the data value as class 2. The processor 50, therefore, does not compress the data item. It does, however, add E000H to the data item. Accordingly, the processor 50 outputs the value E080H.

When the processor receives the next data value 0003H, it classifies the data value in class 1. The processor therefore drops the most significant byte and adds 40H. The resulting output in the compressed video stream is 43H. When the processor receives the third data item from the data stream, 000AH, it classifies the data in class 1. Again the processor 50 drops the most significant byte, 00H, and adds 40H. The resulting data value in the compressed data stream is 4AH. Similarly, the next data value in the input stream is 0005H. This data item is classified in class 1, the most significant byte is dropped and 40H is added. As a result, the processor 50 outputs to 45H and the compressed stream of video data.

The next four input values are 0000H. When the first 0000H input is received, it is classified in class 0. The processor 50, therefore, knows that this data value and any following zero data values should be run length encoded. The processor 50 starts to count the number of successive zeros in the input stream. In this case, there are four successive zeros. Thus, the processor 50 run length encodes the four zeros in the input data stream as 83H and outputs this value in the compressed data stream.

The next two input values 0003H and 0002H are classified in class 1 and compressed and processed as previously described. The processor 50 outputs the values 43H and 42H in the compressed stream of video data.

The next three data values in the input data stream are also 0000H. As previously described, these three data items having values of zero are run length encoded by the processor 50 and the value 82H is output in the compressed stream of data.

Figure 4:
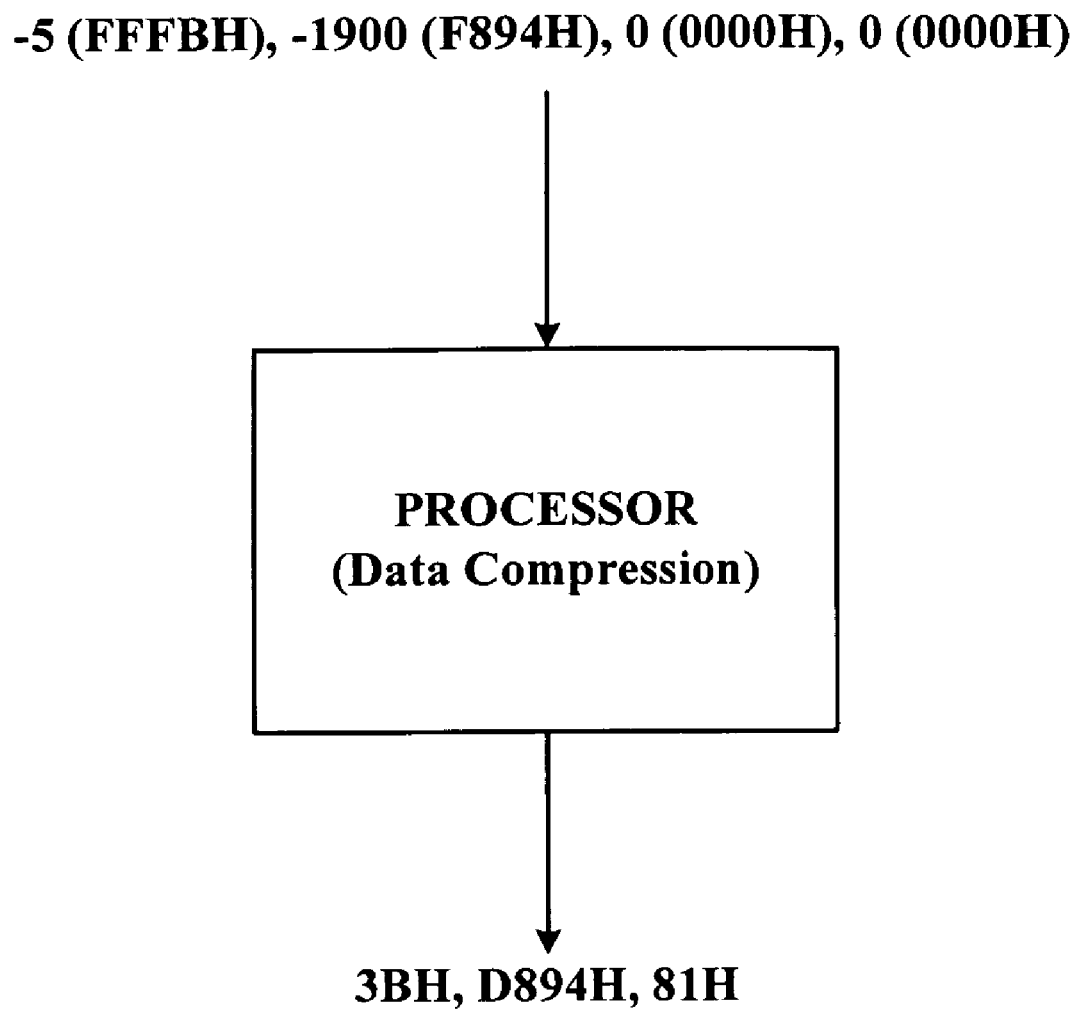
FIG. 4 illustrates a second example of data compression in accordance with a preferred embodiment of the present invention.

FIG. 4 is another example of the compression of data in a video data stream in accordance with the present invention. If the input data is −5, −1900, 0, 0, (FFFBH, F894H, 0000H, 0000H), then the output data is 3BH, D894H, 81H.

Figure 5:
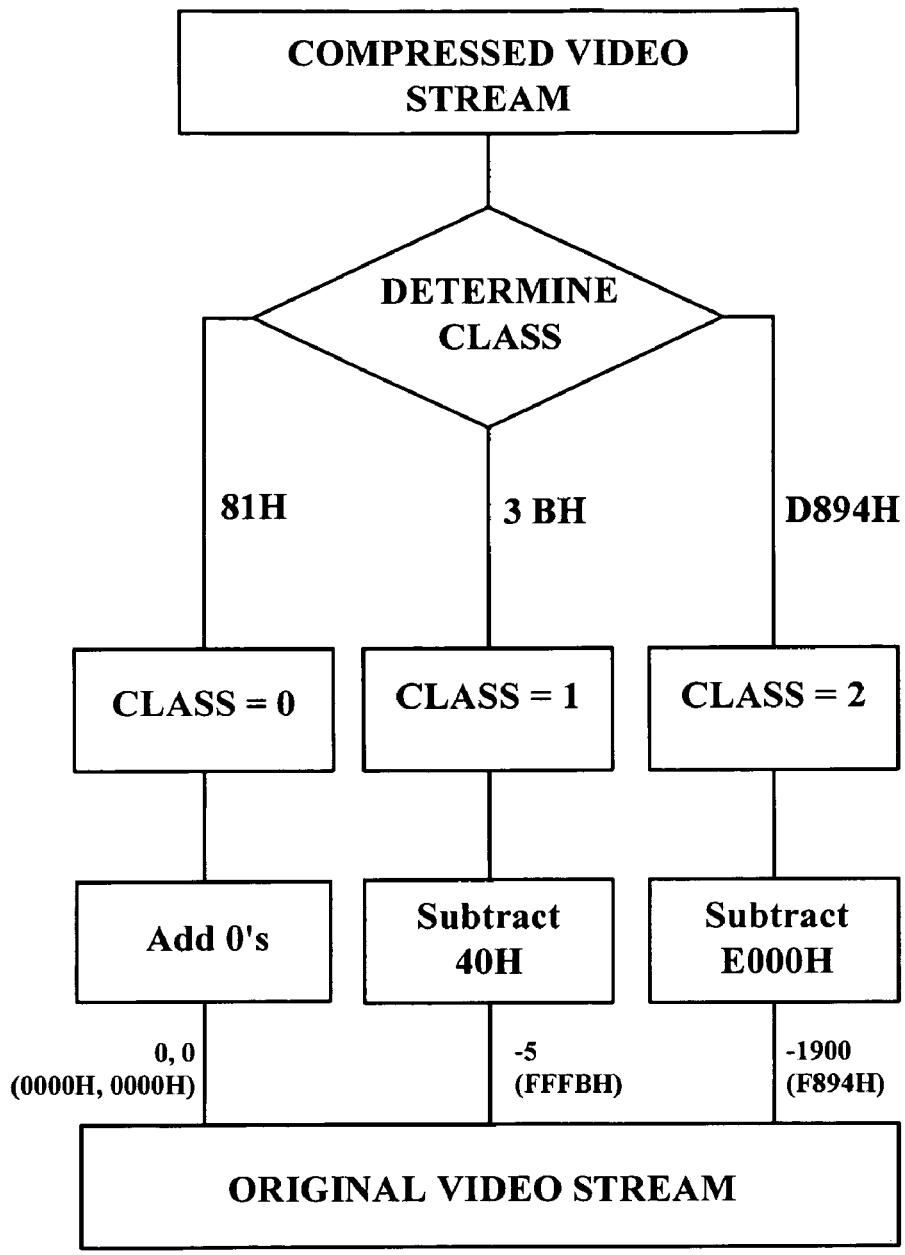
FIG. 5 illustrates a method of decompressing compressed data in accordance with the preferred embodiment of the present invention.

FIG. 5 illustrates the de-compression of a data stream that has been compressed in accordance with the present invention. Namely, the class type is determined based on the ranges of possible compressed values (as shown for example in FIG. 2) and the reverse of the compression is then applied for the selected class to arrive at the decompressed, original data stream.

Figure 6:
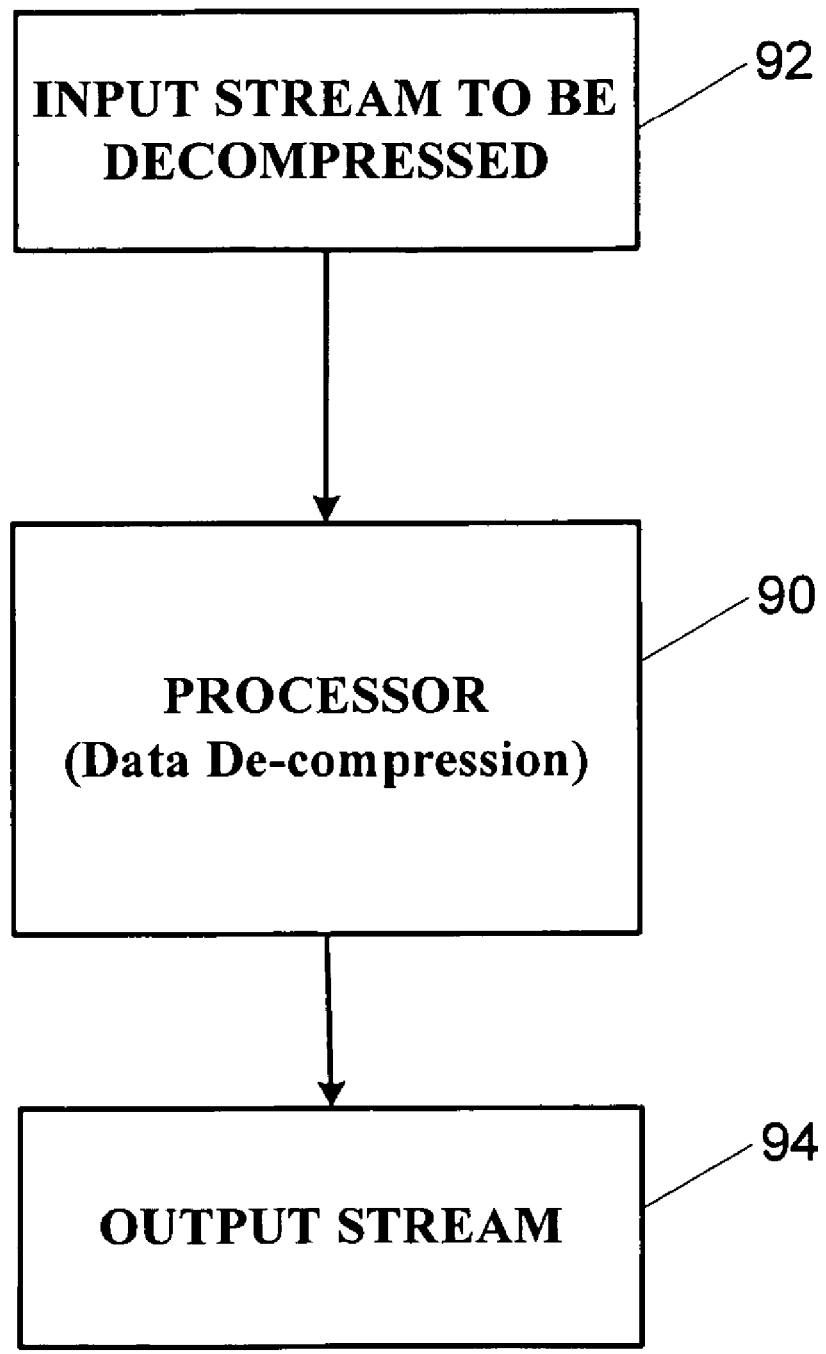
FIG. 6 illustrates an example of the decompression of a stream of video data in accordance with the preferred embodiment of the present invention.

FIG. 6 illustrates a processor 90 that receives a compressed stream of data 92 and outputs a decompressed output stream 94. An example of pseudo code for this process is as follows:

```
INData[size]:
    input compressed code.
outdata[n]:
    decompressed data.
inptr:
    pointer for INData[] array. Inptr = 0 ... size
Below is decompression code for one block
All outdata[] array should be initialized by 0
For (n = 0; n < 64; n++)
```

```
    val = INData[inptr]
    inptr = inptr + 1
    If (val < 80H)              /* CLASS1 */
        outdata[n] = val − 64
    Else If (val < C0H ) /* CLASS0 */
        zerocnt = val − 80H
        n = n + zerocnt /* just proceed the pointer */
    Else                        /* CLASS2 */
        val2 = INData[inptr]
        inptr = inptr + 1
        outdata[n] = ((val << 8) | val2) − E000H
    Endif
```

Figure 7:
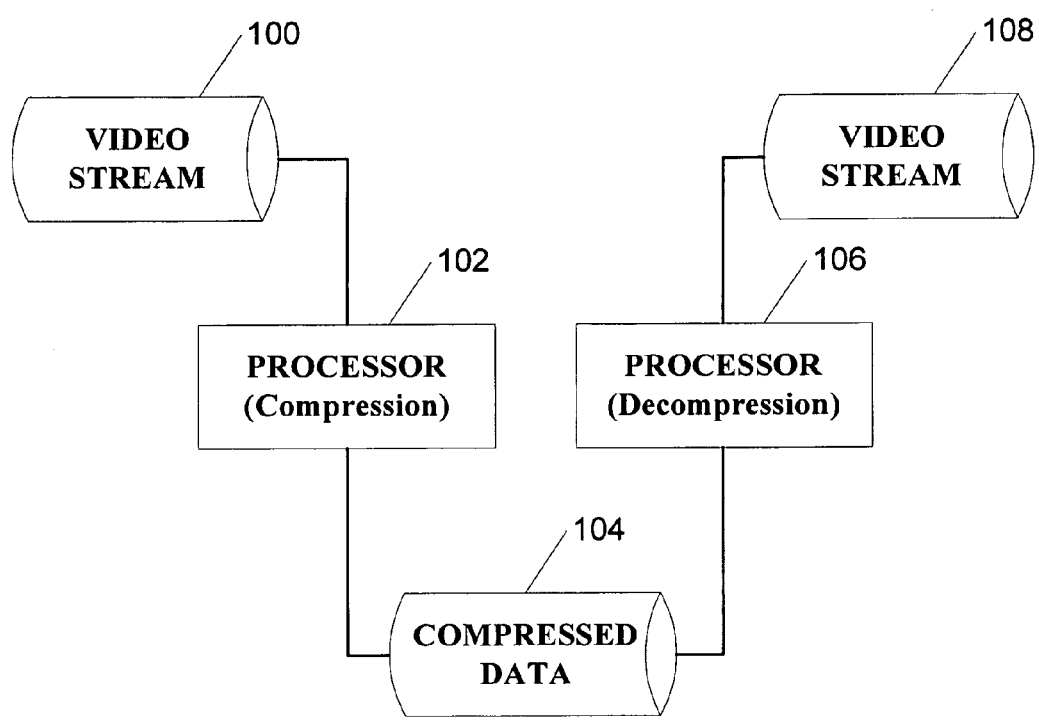
FIG. 7 illustrates circuitry for performing the previously described methods of compression and decompression of streams of video data.

FIG. 7 illustrates the compression and decompression of a stream of video data in accordance with one aspect of the present invention. A stream of video data 100 is provided to a processor 102. The processor 102 performs the compression of the stream of data in accordance with the previously described aspects of the present invention and outputs a compressed stream of data 104. The processor 102 preferably performs the compression steps under the control of a compression program that implements the previously described compression steps. Alternatively, a special purpose hardware device can be implemented that performs the previously described compression steps. The compressed data is then transmitted and a processor 106 receives the compressed stream of data and decompresses the data as previously described. Once again, the processor 102 preferably performs the decompression steps under the control of a decompression program that implements the previously described decompression steps. Alternatively, a special purpose hardware device can be implemented that performs the previously described decompression steps. The processor 106 then outputs the original video stream 108.

While the invention has been described with respect to video data, such as still images and moving images, the compression technique is applicable to a wide range of streaming data and other data.

In compression system and method of the present invention finds special application in software developer kits. The invention can, however, be used in a wide range of applications.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method of compressing a stream of data, comprising:
inputting the stream of data to a processor;
assigning at the processor data in the stream of data whose value is equal to zero to a first class;
assigning at the processor data in the stream of data whose value is between a predetermined positive value and a predetermined negative value, excluding when the data's value is equal to zero, to a second class;
assigning at the processor all other data in the stream of data to a third class;
compressing the data in the first class by run length encoding at the processor; and
compressing the data in the second class by reducing the size of the data at the processor.

2. The method as claimed in claim 1, wherein the compressing of the data in the second class includes dropping the most significant bits of the data.

3. The method as claimed in claim 2, wherein the compressing of the data in the second class includes adding a constant to the reduced size data.

4. The method as claimed in claim 3, wherein a constant is added to data in the third class.

5. The method as claimed in claim 2, wherein the data in the second class is sixteen bits long and the eight most significant bits of data in the second class are dropped.

6. The method as claimed in claim 5, wherein the constant added to data in the second class is 40 hexadecimal.

7. The method as claimed in claim 6, wherein C000H plus 2000H is added to data in the third class.

8. The method as claimed in claim 1, wherein data assigned to each class is sixteen bits long, the predetermined positive value is 63 and the predetermined negative value is −64.

9. The method as claimed in claim 8, wherein the eight most significant bits of the data in the second class are dropped.

10. The method as claimed in claim 9, wherein the constant added to data in the second class is 40 hexadecimal.

11. The method as claimed in claim 10, wherein C000 hexadecimal plus 2000 hexadecimal is added to data in the third class.

12. The method as claimed in claim 11, wherein the number of zeros in the run length encoding of the data in the first class is represented by 80 hexadecimal plus the number of zeros less one.

13. A method of compressing a stream of data containing a plurality of data items, comprising:
(a) inputting the stream of data to a processor;
(b) determining at the processor the values of a plurality of data items in the stream of data;
(c) run length encoding at the processor successive data items having a value of zero; and
(d) compressing the data items at the processor by dropping a predetermined number of most significant bits from the data items, such that only bits having a value of zero are dropped, if the value of the data items is not equal to zero and is between a predetermined positive value and a predetermined negative value.

14. The method as claimed in claim 13, further comprising repeating steps (b)-(d) for successive data items in the stream of data.

15. The method as claimed in claim 13, further comprising adding a constant to the data items whose most significant bits were dropped.

16. The method as claimed in claim 15, further comprising adding a constant to all of the data items that are equal to or exceed the predetermined positive value or are equal to or less than the predetermined negative value.

17. The method as claimed in claim 13, wherein the data items are 16 bits long, the predetermined positive value is 63, the predetermined negative value is negative 64 and the eight most significant bits of each of the data items is dropped when the value of the date items is not equal to zero and is between the positive predetermined value and the negative predetermined value.

18. The method claimed in claim 17, wherein 40H is added to the data item having its eight most significant bits dropped.

19. The method as claimed in claim 18, wherein C000H plus 2000H is added to the data items having a value greater than or equal to the predetermined positive value and to the data items having a value less than or equal to the predetermined negative value.

20. Apparatus for compressing a stream of data, comprising:
a processor to:
assign data whose value is equal to zero to a first class;
assign data whose value is between a predetermined positive value and a predetermined negative value, excluding when the data's value is equal to zero, to a second class;
assign all other data in the stream of data in a third class;
compress the data in the first class by run length encoding; and
compress the data in the second class by reducing the size of the data.

21. The apparatus as claimed in claim 20, wherein the processor in compressing data in the second class drops the most significant bits of the data.

22. The apparatus as claimed in claim 21, wherein the processor in compressing data in the second class adds a constant to the reduced size data.

23. The apparatus as claimed in claim 22, wherein the processor in placing data in the third class adds a constant to data in the third class.

24. The apparatus as claimed in claim 20, wherein the data assigned to each class is sixteen bits long and the processor in compressing data in the second class drops the eight most significant bits of data.

25. The apparatus as claimed in claim 24, wherein processor in compressing data in the second class adds 40 hexadecimal to data in the second class.

26. The apparatus as claimed in claim 25, wherein the processor in compressing data adds C000H plus 2000H to data in the third class.

27. The apparatus as claimed in claim 20, wherein the data processed by the processor is sixteen bits long, the predetermined positive value is 63 and the predetermined negative value is −64.

28. The apparatus as claimed in claim 27, wherein the processor in compressing data in the second class drops the eight most significant bits of data in the second class.

29. The apparatus as claimed in claim 28, wherein the processor in compressing data in the second class adds 40 hexadecimal to data in the second class.

30. The apparatus as claimed in claim 29, wherein the processor in compressing data in the third class adds C000 hexadecimal plus 2000 hexadecimal to data in the third class.

31. The apparatus as claimed in claim 30, wherein the number of zeros in the run length encoding of the data in the first class is represented by 80 hexadecimal plus the number of zeros less one.

32. Apparatus for compressing a stream of data containing a plurality of data items, comprising:
a processor to:
determine the values of a plurality of data items in the stream of data;
run length encode successive data items having a value of zero; and
compress the data items by dropping a predetermined number of most significant bits from the data items such that only bits having a value of zero are dropped, if the value of the data items is not equal to zero and is between a predetermined positive value and a predetermined negative value.

33. The apparatus as claimed in claim 32, wherein each successive data item in the stream of data is processed by the processor.

34. The apparatus as claimed in claim 32, wherein the processor further adds a constant to the data items whose most significant bits were dropped.

35. The apparatus as claimed in claim 34, wherein the processor further adds a constant to all data items that are equal to or exceed the predetermined positive value or is equal to or less than the predetermined negative value.

36. The apparatus as claimed in claim 13, wherein the data items are 16 bits long, the predetermined positive value is 63, the predetermined negative value is negative 64 and the processor drops the eight most significant bits of data of the data items in the second class.

37. The apparatus claimed in claim 36, wherein the processor adds 40H to the data items having their eight most significant bits dropped.

38. The apparatus as claimed in claim 32, wherein the processor further adds C000H plus 2000H to the data items greater than or equal to the predetermined positive value and to the data items less than or equal to the predetermined negative value.

39. A computer readable medium having a sequence of instructions for compressing a stream of data, wherein execution of the instructions causes a processor to:
assign data whose value is equal to zero to a first class;
assign data whose value is between a predetermined positive value and a predetermined negative value, excluding when the data's value is equal to zero, to a second class;
assign all other data in the stream of data to a third class;
compress the data in the first class by run length encoding; and
compressing the data in the second class by reducing the size of the data.

40. The medium as claimed in claim 39, wherein the compressing of the data in the second class includes dropping the most significant bits of the data.

41. The medium as claimed in claim 40, wherein the compressing of the data in the second class includes adding a constant to the reduced size data.

42. The medium as claimed in claim 41, wherein a constant is added to data in the third class.

43. The medium as claimed in claim 42, wherein the data is sixteen bits long and the eight most significant bits of data in the second class are dropped.

44. The medium as claimed in claim 41, wherein the constant added to data in the second class is 40 hexadecimal.

45. The medium as claimed in claim 44, wherein C000H plus 2000H is added to data in the third class.

46. The medium as claimed in claim 45, wherein the assigned data is sixteen bits long and the predetermined positive value is 63 and the predetermined negative value is −64.

47. The medium as claimed in claim 46, wherein the eight most significant bits of data in the second class are dropped.

48. The medium as claimed in claim 39, wherein the constant added to data in the second class is 40 hexadecimal.

49. The medium as claimed in claim 48, wherein C000 hexadecimal plus 2000 hexadecimal is added to data in the third class.

50. The medium as claimed in claim 49, wherein the number of zeros in the run length encoding of the data in the first class is represented by 80 hexadecimal plus the number of zeros less one.

51. A system for sending and receiving a compressed stream of data comprising:
(a) a compression processor for receiving a stream of uncompressed data,
assigning data in the stream of data whose value is equal to zero to a first class,
assigning data in the stream of data whose value is between a predetermined positive value and a predetermined negative value, excluding when the data's value is equal to zero, to a second class;
assigning all other data in the stream of data to a third class,
compressing the data in the first class by run length encoding,
compressing the data in the second class by reducing the size of the data, and
transmitting a stream of the compressed data to a remote location; and
(b) a decompression processor for
receiving the stream of compressed data and decompressing the compressed data.

\* \* \* \* \*

UNITED STATES PATENT AND TRADEMARK OFFICE
CERTIFICATE OF CORRECTION

PATENT NO.       : 7,646,923 B2
APPLICATION NO. : 11/045774
DATED            : January 12, 2010
INVENTOR(S)      : Masahiro Yasue It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1386 days.

Signed and Sealed this

Sixteenth Day of November, 2010

David J. Kappos
*Director of the United States Patent and Trademark Office*

UNITED STATES PATENT AND TRADEMARK OFFICE
CERTIFICATE OF CORRECTION

PATENT NO.        : 7,646,923 B2
APPLICATION NO.   : 11/045774
DATED             : January 12, 2010
INVENTOR(S)       : Masahiro Yasue Page 1 of 1

It is certified that error appears in the above-identified patent and that said Letters Patent is hereby corrected as shown below:

Title page, Item [57], line 2, "is" should read --are--.
Title page, Item [57], line 9, "is" should read --are--.
Title page, Item [57], line 10, "is" should read --are--.
Title page, Item [57], line 12, first and second occurrence, "is" should read --are--.
Column 2, line 13, "is" should read --are--.
Column 2, line 38, after "data" delete ",".
Column 3, line 16, "compressing" should read --compress--.
Column 4, line 11, "in" should read --is--.
Column 4, line 63, after "accordance" insert --with--.
Column 5, line 3, "zero" should read --zeros--.
Column 5, line 9, "bit" should read --bits--.
Column 5, line 14, "are" should read --is--.
Column 6, line 44, "is" should read --are--.
Column 6, line 46, after "such" insert --as--.
Column 6, line 60, after "stream" delete ",".
Column 7, line 2, "corresponds" should read --correspond--.
Column 8, line 40, "In" should read --The--.
Column 8, line 41, "finds" should read --find--.
Column 9, line 26, after "wherein" insert --the--.
Column 11, line 10, after "apparatus" insert --as--.
Column 11, line 28, "compressing" should read --compress--.

Signed and Sealed this
Nineteenth Day of June, 2012

David J. Kappos
*Director of the United States Patent and Trademark Office*